Figure 1:
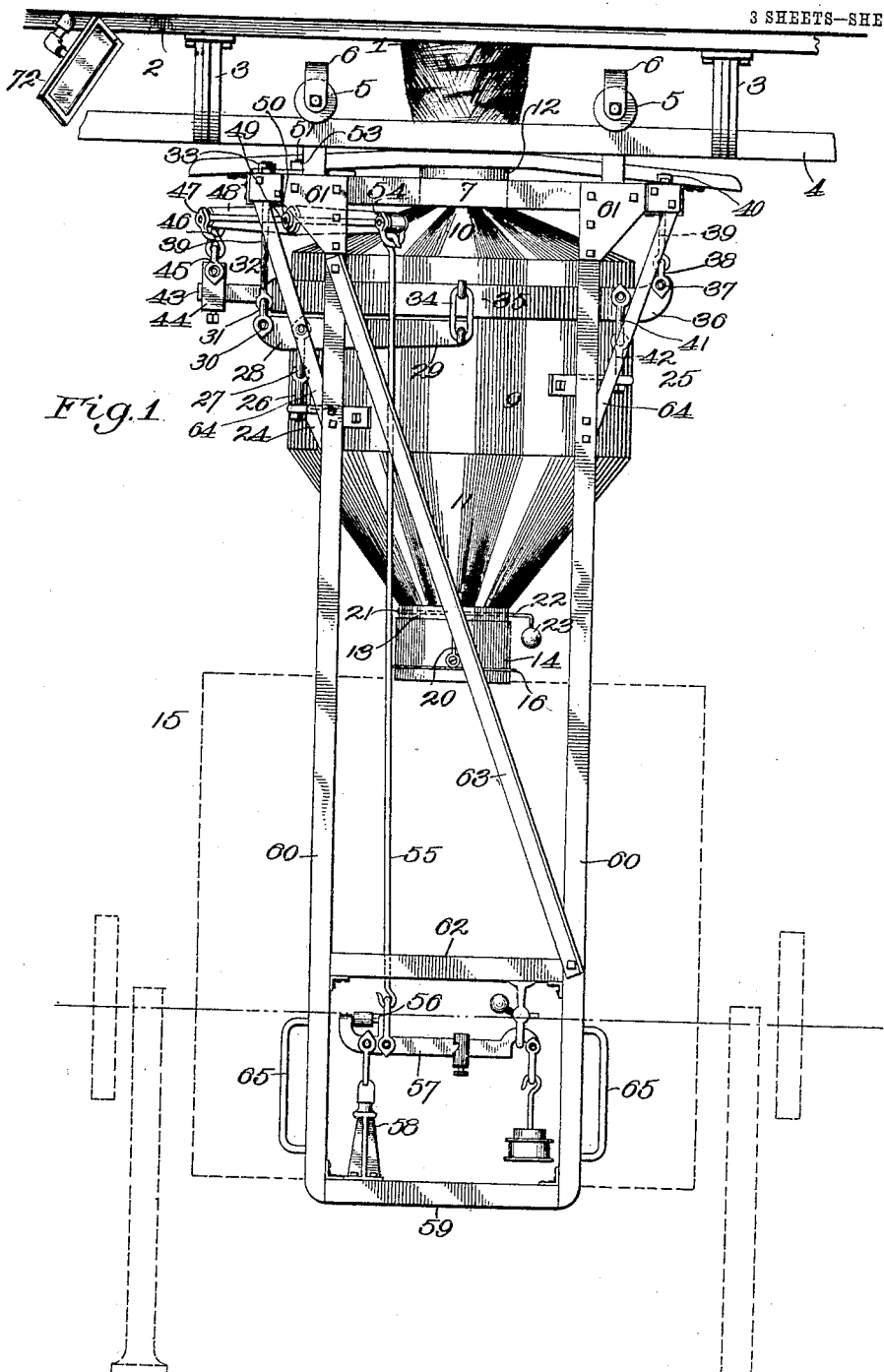

No. 818,505. PATENTED APR. 24, 1906.
F. J. WOLFF.
TRAVELING HOPPER SCALE.
APPLICATION FILED SEPT. 11, 1905.

3 SHEETS—SHEET 1.

Witnesses
Frank R. Islow.
H. C. Rodgers.

Inventor
F. J. Wolff
By George J. Thorpe
Atty.

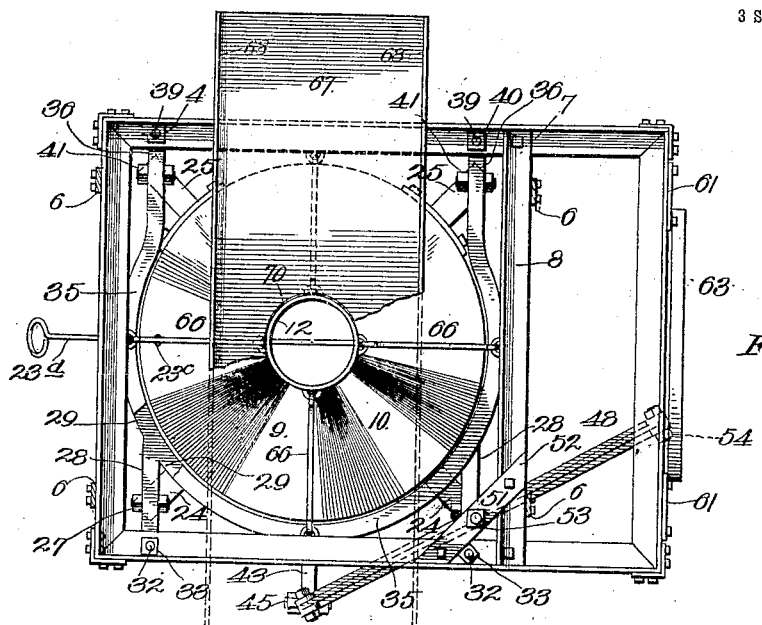

No. 818,505. PATENTED APR. 24, 1906.
F. J. WOLFF.
TRAVELING HOPPER SCALE.
APPLICATION FILED SEPT. 11, 1905.
3 SHEETS—SHEET 3.
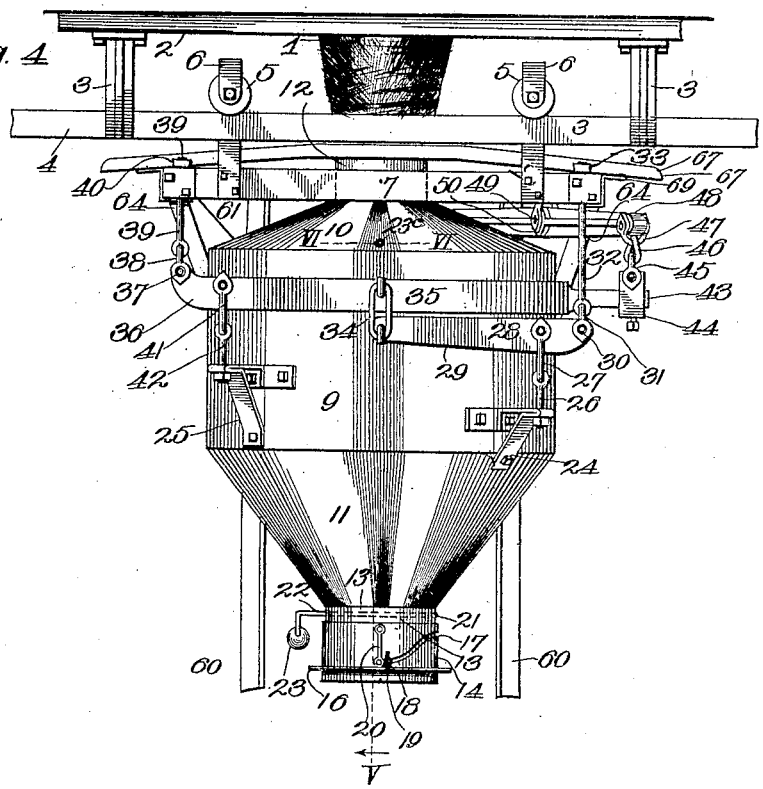
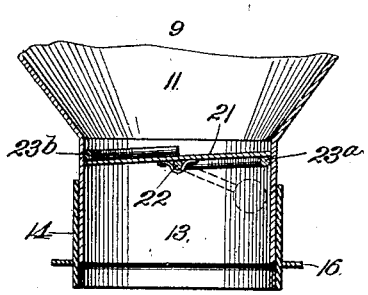
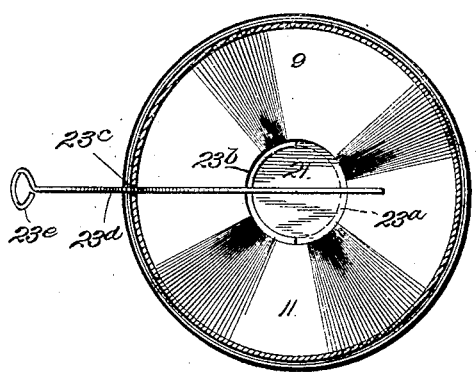
Witnesses
Frank R. Blow
H. C. Rodgers
Inventor
F. J. Wolff
By George B. Lorfi
atty.

UNITED STATES PATENT OFFICE.

FREDRICH J. WOLFF, OF KANSAS CITY, MISSOURI.

TRAVELING HOPPER-SCALE.

No. 818,505. Specification of Letters Patent. Patented April 24, 1906.

Application filed September 11, 1905. Serial No. 277,835.

*To all whom it may concern:*

Be it known that I, FREDRICH J. WOLFF, a citizen of the United States, residing at Kansas City, in the county of Jackson and State of Missouri, have invented certain new and useful Improvements in Traveling Hopper-Scales, of which the following is a specification.

This invention relates to traveling hopper-scales; and my object is to produce a scale of this character which can be adjusted to accommodate any one of a series of supply-hoppers and any one of a series of dough-mixers, and thereby facilitate the progress of mixing dough for large baking establishments.

With this general object in view and others as hereinafter appear the invention consists in certain novel and peculiar features of construction and organization, as hereinafter described and claimed, and in order that it may be fully understood reference is to be had to the accompanying drawings, in which—

Figure 1 is a front view of a traveling hopper-scale embodying my invention. Fig. 2 is a horizontal section taken on the line II II of Fig. 3. Fig. 3 is a side elevation of the scale with the trackway in vertical section. Fig. 4 is a rear view of the traveling hopper-scale with certain parts broken away and the agitator omitted. Fig. 5 is a section on the dotted line V of Fig. 4. Fig. 6 is a horizontal section taken on the line VI VI of Fig. 4 with the weighing-element attachments omitted.

In the said drawings, 1 represents flexible discharge-spouts of an overhead bin (not shown) for supplying the flour.

2 is an elevated support, such as timbers, secured to the upper portion of the room. 3 represents hangers depending from said overhead support and provided with parallel track-rails 4, and engaging each of said track-rails so as to travel thereon are a pair of grooved rollers 5, mounted in brackets 6, projecting upward from a frame 7, of rectangular form by preference, said frame having a cross-bar 8 disposed parallel with and between its end bars, the front pair of brackets 6 rising from said cross-bar 8. Said frame is supported so that its side bars, rear end bar, and cross-bar 8 shall be equal distances from the center of a cylindrical hopper 9, said hopper by preference having its upper and lower ends of tapering form, as at 10 and 11, respectively, the upwardly-tapering portion 10 terminating in a vertical collar 12 and its lower end in a depending neck 13. Fitted rotatably and slidingly on said neck is a collar 14, adapted to project down into the dough-mixer 15, (shown in dotted lines,) said adjustable collar 14 having a flange 16 to rest upon the hood of the dough-mixer, so as to bridge the joint between the hood and the lower end of said collar. Said collar is provided with one or more spiral grooves 17, engaging outwardly-projecting pins 18, clamping-nuts 19, engaging said pins, being utilized to clamp said collar at the desired adjustment and handles 20 being provided to facilitate the adjustment of the collar.

The hopper occupies a position in the vertical plane of the spouts 1, it being also understood that a series of dough-mixers—one only appearing—will be associated in the same horizontal plane in order that the hopper may be adjusted along the trackway for the purpose of discharging its contents into one of said dough-mixers, the neck of the hopper being provided with a valve 21 of circular form and secured upon the shaft 22, extending through the neck 13 and projecting from the same at one end and terminating in a crank-arm equipped with a weight 23, said weight being adapted to hold the valve yieldingly down upon the half-ring 23$^a$ and its opposite side yieldingly up against the half-ring 23$^b$, these rings forming a stop to limit the closing movement of the valve and, with the latter, forming a flour-proof connection for the hopper.

23$^c$ indicates a hole in the tapering portion 10, and engaging the same is a substantially inverted-V-shaped agitator 23$^d$, the apex of the agitator resting upon the hopper and one arm projecting down into the latter and the other externally thereof and terminating in a handle 23$^e$. The manipulation of this agitator in various directions insures the proper accumulation of flour in the hopper and also insures its complete discharge from said hopper into the dough-mixer.

Secured to and disposed at equal distances from each other and from the center of the hopper are brackets 24 and 25, the former by preference in a lower horizontal plane than the latter, all of said brackets being disposed externally of and secured rigidly to the hopper and of the type shown or of any other suitable or preferred type.

26 indicates eyebolts secured to and extending upwardly from brackets 24, and 27 indicates stirrups pivotally suspended from the rigid arms 28 of a semicircular lever 29, said lever following the contour of and being slightly out of contact with the hopper. The outer ends of arms 28 of lever 29 are fulcrumed, as at 30, on the inverted stirrups 31, pivotally engaging the rear eyebolts 32, extending through one side bar of the rectangular frame and engaged at their upper ends by retaining-nuts 33.

34 indicate links pivotally connecting the inner ends of the semicircular lever 29 with the sides of the upper and substantially semicircular lever 35, said lever having its ends continued in the form of arms 36, which project oppositely from the hopper with respect to arms 28 of lever 29, and said arms are fulcrumed, as at 37, in the inverted stirrups 38, pivotally engaging eyebolts 39, extending up through the opposite side of the rectangular frame and engaged at their upper ends by retaining-nuts 40.

Pivotally suspended from arms 36 of lever 35 are stirrups 41, pivotally connected to upwardly-projecting eyebolts 42, carried by brackets 25. Projecting outwardly from the center of lever 35 is an arm 43, carrying an adjustable poise 44, said poise being pivotally connected through the medium of inverted stirrup 45, link 46, and stirrup 47 to one end of the obliquely-disposed lever 48, underlying the rectangular frame and pivotally mounted, as at 49, in an inverted stirrup 50, pivotally engaging an eyebolt or hook 51, extending up through the cross-plate 52, connecting one of the side bars of the frame with the cross-bar thereof, a retaining-nut 53 engaging the upper end of said bolt and resting upon said cross-plate. At its front end lever 48 is disposed in the vertical plane of the front bar of the rectangular frame, and below the latter and pivotally suspended from said end of the lever is a stirrup 54, pivotally engaged by the upper end of a rod 55, the lower end of said rod being pivotally linked, as at 56, to the scale-beam 57, fulcrumed upon a standard 58, mounted upon a cross-bar 59, connecting the lower ends of a pair of vertical bars 60, connected at their upper ends by plates 61 to the front bar of the rectangular frame 7, said bars 60 being braced above the scale-beam by a cross-bar 62, through which rod 55 extends, and also by an oblique brace 63. The scale-carrying frame composed of bars 59 and 60 is furthermore braced by the oblique braces 64, secured at their lower ends to bars 60 and at their upper ends to the rectangular frame vertically below the ends of cross-bar 8.

The scale carried by the scale-frame may be of the well-known construction shown or of any other suitable or preferred type which will be actuated by the upward movement imparted to rod 55, and therefore does not need any special description of its construction nor any detailed reference to its mode of operation. The scale-frame is equipped with handles 65 for convenience in effecting the travel of the frame 7 and the hopper carried thereby with reference to the track-rails.

Pivotally connecting the neck 12 of the hopper at diametrically-opposite points with the rear bar, cross-bar, and side bars of the rectangular frame about midway the length of said bars are links 66, these links guarding against tilting or oscillatory movement of the hopper.

For convenience in effecting the engagement of the flexible spouts with the hopper a plate 67, provided with upwardly-projecting marginal flanges 68, extends from side bar to side bar of frame 7 and over the top of the hopper, said plate being secured by brackets 69 to said side bars and being provided with a central hole 70, (see Fig. 2,) into which the metallic ring 71 of spout 1 slips when the hole 70 registers with it, and in order that the person adjusting the hopper-scale may effect the engagement between the hopper and said spout expeditiously a mirror 72 is secured to the overhead support contiguous to each spout 1 and so disposed that the lower end of the contiguous spout is reflected therein and observable to the operator grasping handles 65 and standing upon the floor of the room. By means of this mirror the operator is enabled to quickly and easily dispose the hopper-scale in proper relation to the desired spout, because when nearly in position the reflection of the hole 70 in the mirror is apparent to said operator. The mirror is adjustably connected to its support in order that it need not be attached to the support with mathematical precision, but can be turned in the desired direction afterward, so that the operator can readily ascertain the relation existing between hole 70 and the spout.

In the practical operation of the machine the poise and weights of the scale proper are set to weigh the desired amount of flour or other material to be discharged into the hopper, the latter being of course disposed vertically below the spout of the desired bin above in the manner hereinbefore explained. The operator then manipulates the mechanism, such as a lever or pull-rod, (not shown because of well-known construction,) which controls the valve of said bin, so that the flour shall fall down into the hopper, the operator cutting off the discharge of such substance from the bin when the scale-beam balances. In the weighing operation it will be seen that as the flour or other material accumulates in the hopper, and thereby increases its weight and causes it to move downward, the connection between brackets 24 and the lever 29 will cause the latter through the instrumentality of links 34 to pull downward on lever 35, said lever 29 fulcruming on the inverted stirrups 31, suspended, as described, from the rectangular frame. It will also be seen that the downward movement of the hopper through the medium of brackets 25 and the connections between the same and lever 35 will pull downward on lever 35, the latter fulcruming on its inverted stirrups 38, suspended, as described, from the rectangular frame. The downward movement of the lever 35 in turn pulls downward upon the rear end of the oblique lever 48, so that the front end of said lever shall rise and pull upward upon the scale-beam 57 until the latter is balanced. The handles 65 are now grasped to run the hopper along the trackway until it is disposed over the proper dough-mixer, the attendant lowering the adjustable collar 14 into the dough-mixer, as hereinbefore explained, and then opening valve 21 to effect the discharge of the contents of the hopper into the dough-mixer, it being understood in this connection that the dough-mixer is so disposed with reference to the hopper that the pendent scale-frame depending below the upper portion of the dough-mixer travels in a plane forward of the same, so that the hopper can be moved past said mixer, if desired. All subsequent operations are repetitions of those described.

From the above description it will be apparent that I have produced a traveling hopper-scale embodying the features of advantage enumerated as desirable.

Having thus described the invention, what I claim as new, and desire to secure by Letters Patent, is—

1. In a hopper-scale, the combination of a frame, a hopper within the said frame, a lever pivotally suspended near one end from the frame and linked near said end directly to the hopper, the other end of said lever projecting beyond the opposite side of the hopper, a second lever pivotally suspended from the frame at the same side of the hopper as the projecting end of the first-named lever and having its inner ends linked to said first-mentioned lever and linked at an intermediate point directly to the hopper, and a beam disposed horizontally within the frame and pivotally suspended therefrom, one end of said beam being linked to the projecting end of the first-mentioned lever.

2. The combination of a frame, a hopper inclosed by the frame, a semicircular lever disposed around the hopper and linked directly thereto near its ends, said lever being pivotally suspended at its ends from the frame, a beam pivotally suspended from the frame and having one end linked to the central point of the said lever, and a second semicircular lever disposed around the hopper and pivotally suspended from the frame said lever being linked at its ends to the sides of the first-mentioned lever and at intermediate points directly to the hopper.

3. The combination of a supporting-frame, a hopper within the same, a semicircular lever disposed around the hopper and having its ends pivotally suspended from the frame, said lever being linked directly to the hopper near its ends and provided at its center with a lateral arm, a beam pivotally suspended from the frame and having one end linked to the said lateral arm, and a second semicircular lever pivotally suspended from the frame and linked at intermediate points directly to the hopper, the ends of said lever being linked to the sides of the first-mentioned lever.

4. The combination of a supporting-frame, a hopper, a semicircular lever disposed around and linked near its ends directly to the hopper and having its ends pivotally suspended from the frame, a beam pivotally suspended from the frame and linked to the center of said lever, and a second semicircular lever disposed around the hopper and linked directly thereto, said lever having its ends linked to the first-mentioned lever and being provided with lateral arms by which it is pivotally suspended from the frame.

5. The combination of a supporting-frame, a hopper within the same, a pair of levers pivotally suspended from the frame and linked directly to the hopper and to each other, a beam pivotally suspended from the frame and having one end linked to one of the levers, a frame secured rigidly to one side of the supporting-frame and arranged below the end of the said beam and depending below the hopper, a scale-beam in the lower end of said frame, and a connection between said scale-beam and the first-mentioned beam.

6. The combination of a trackway, a supporting-frame arranged to travel thereon, a hopper mounted within said frame, a leverage connection between the hopper and said frame, a rigid frame depending from one side of the supporting-frame and provided with handles on its sides, a scale-beam within said depending frame, and a connection between said scale-beam and the leverage connection of the hopper and the supporting-frame.

7. In a traveling hopper-scale, a traveling frame, a hopper having a leverage connection with and arranged centrally of the frame, and having its upper end open, and a plate secured to the frame and disposed over the hopper and provided with an opening vertically above the open upper end of the hopper.

8. In a traveling hopper-scale, a traveling frame, a hopper having a leverage connection with and arranged centrally of the frame and having its upper end open, and a plate secured to the frame over the open upper end of the hopper and having a central opening registering with the upper end of the hopper, said plate being inclined slightly downward toward its ends and having upturned side flanges.

9. In a hopper-scale, a hopper having its lower end open and provided with a depending neck around said opening, oppositely-disposed half-rings on the inner wall of said neck, a valve controlling the said opening, and means for holding the valve up against one half-ring and down upon the other half-ring.

10. In a hopper-scale, a hopper having its lower end open and provided with a depending neck around said opening, a valve controlling said opening, means for holding the valve yieldingly closed, a sleeve adjustably secured on said neck and provided with an outwardly-projecting flange said sleeve being arranged to be projected beyond said neck to enter a receptacle with its flange resting on the receptacle.

11. In a hopper-scale, a hopper having its lower end open and provided with a depending neck around said opening, a valve controlling said opening, means for holding the valve yieldingly closed, a sleeve adjustably secured on said neck and provided with an outwardly-projecting flange, a pin projecting outward from said neck, a sleeve fitting adjustably on the neck and provided with a slot engaging the pin, and a clamping-nut engaging the outer end of said pin.

12. In a traveling hopper-scale for bakeries, the combination with the hopper, of a V-shaped agitator loosely hung at its point in the wall of the hopper and having one arm playing in the hopper and its other arm depending freely outside the hopper.

In testimony whereof I affix my signature in the presence of two witnesses.

FREDRICH J. WOLFF.

Witnesses:
H. C. RODGERS,
G. Y. THORPE.